No. 12,357. REISSUED JUNE 13, 1905.

R. G. JULIEN.

BOTTLE.

APPLICATION FILED MAY 9, 1905.

Witnesses:
Wm. J. Hodges
Lewis Hodges

Inventor:
Ramon Gabarro Julien
by Luis de Castro-Palomino
Atty.

PHOTO-LITHOGRAPHED BY SACKETT & WILHELMS LITHO. & PTG. CO. NEW YORK.

No. 12,357. Reissued June 13, 1905.

UNITED STATES PATENT OFFICE.

RAMON GABARRO JULIEN, OF JEREZ DE LA FRONTERA, SPAIN, ASSIGNOR TO PEDRO DE DOMECQ, OF JEREZ DE LA FRONTERA, SPAIN.

BOTTLE.

SPECIFICATION forming part of Reissued Letters Patent No. 12,357, dated June 13, 1905.

Original No. 786,295, dated April 4, 1905. Application for reissue filed May 9, 1905. Serial No. 259,649.

*To all whom it may concern:*

Be it known that I, RAMON GABARRO JULIEN, a subject of the King of Spain, residing at Jerez de la Frontera, Spain, have invented certain new and useful Improvements in Bottles; and I do hereby declare the following to be a full, clear, and exact description of the invention, such as will enable others skilled in the art to which it appertains to make and use the same.

This invention contemplates certain new and useful improvements in bottles, and relates more particularly to that class of bottles constructed to prevent fraudulent or surreptitious refilling.

The invention has for its object the production of a simple and inexpensive device of this character which when once placed in position in a bottle will readily permit the latter to be emptied of its contents and at the same time prevent refilling thereof or adulteration of said contents.

A further object of the invention is to provide means whereby an attempt to introduce liquid of any kind into the bottle after the same has once been filled will be readily detected and become at once apparent.

The invention will be hereinafter fully set forth, and particularly pointed out in the claims.

Figure 1:
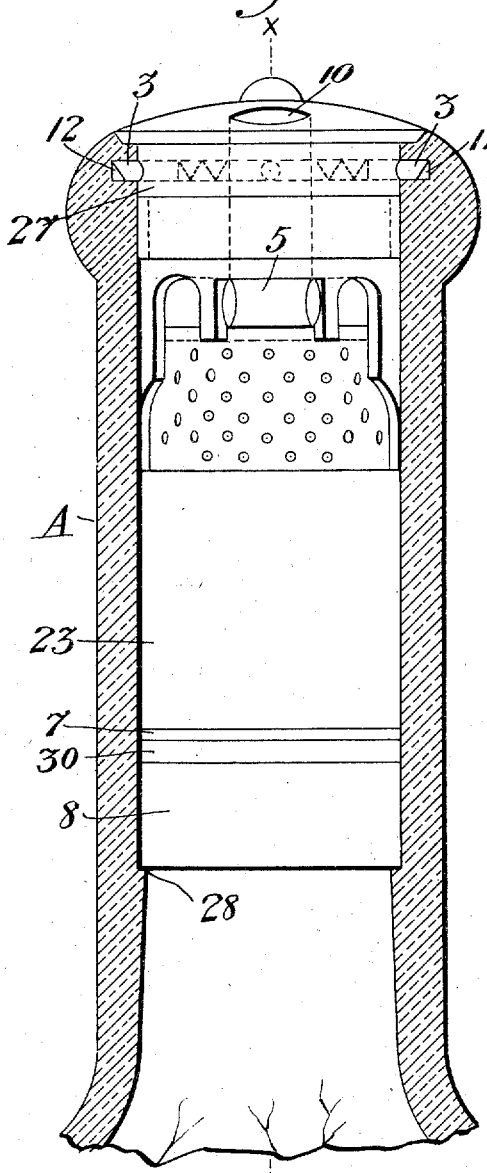
Figure 2:
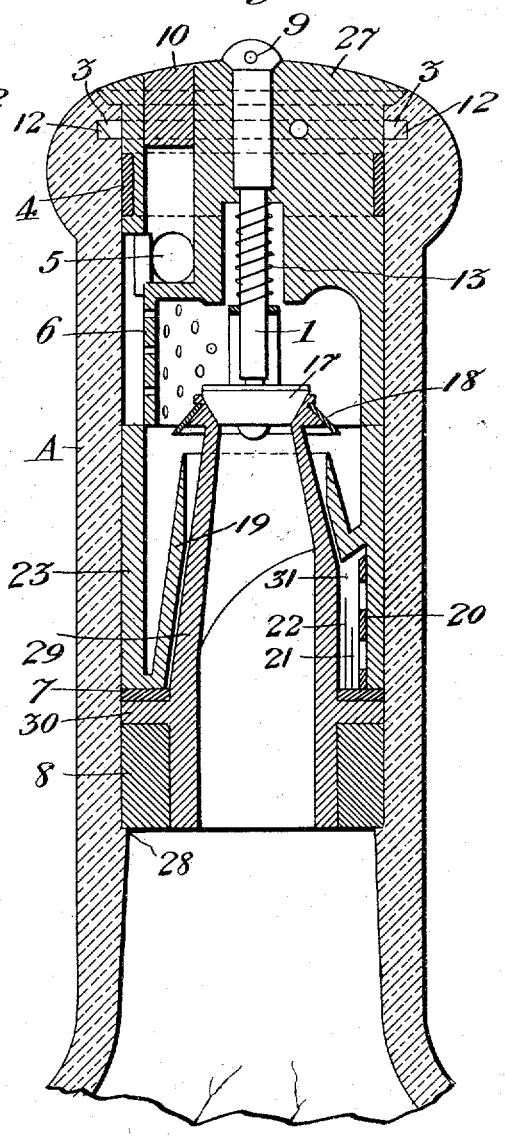

In the accompanying drawings, Figure 1 is a sectional view of a bottle, illustrating my invention, the latter being shown in full lines. Fig. 2 is a sectional view on the line X X, Fig. 1.

Referring to the drawings, A designates a bottle the neck of which is provided with an annular groove 12, adapted to receive spring-pressed locking-nuts 3, carried by a plug 27, whereby the latter is permanently locked in position and can only be removed by breaking the bottle. Said plug is provided with a depending web or apron 6, the same being perforated, as shown, and above said apron is formed a conduit or channel 5, which terminates in an outlet-channel 2, normally closed by a stopper 10. The neck of the bottle is also provided with an annular shoulder 28, which serves as a support for a sleeve or collar 8, upon the top of which rests a flange 30 of a tubular member 29, the upper end of the latter being provided with a valve-seat. A valve 17, carried by a pin 1, mounted in plug 27, is normally held against said seat by a spring 13. Resting upon a ring or washer 7 and interposed between the wall of the bottle and the tubular member 29 is a cup-like receptacle 23, the latter being provided with a sleeve 19, surrounding the member 29, but not contacting therewith. The receptacle 23 is provided with an inclined bottom, and between the highest point of the latter and the washer 7 is formed an indicating-space 31, in which are placed a strip 21 of chemically-prepared paper, a second strip 22 of unprepared paper, and a plate of ivory or other similar substance provided with sight-openings, said strips of paper being provided with suitable labels, the purpose of which will appear later. The paper 21 is prepared with a chemical substance which changes color when coming into contact with any liquid that may be poured into the bottle in an attempt to refill the latter or adulterate its contents. The valve-seat of the member 29 is surrounded by a conical flange which extends beyond the top edge of the sleeve 19 and deflects any liquor that may be surreptitiously introduced into the receptacle 23. The stem 1 is preferably provided with a hole 9 for the insertion of a suitable instrument to withdraw valve 17 from its seat, although this may be done in any preferred manner. I also provide a washer 4 to make a tight joint between plug 27 and the neck of the bottle.

In practice the bottle is first filled with the desired contents, after which the sleeve or collar 8 is placed upon the shoulder 28. The tubular member 29, washer 7, papers 21 and 22, ivory 20, and receptacle 23 are then successively placed in their relative positions. The plug 27 is then inserted, the locking-lugs 3 thereof engaging the recess 12, the apron 6 extending below the upper end of the member 29. In order to empty the bottle, the stopper 10 is withdrawn, after which valve 17 is held raised. Upon inclining the bottle sufficiently the liquor will pass out through member 29 in space 25, and thence through the perforations of apron 6 into conduit 5, and finally through the outlet 2. Should an attempt be made to introduce liquor into the bottle, the same can only enter through the conduits 2 and 5, from whence it falls into the receptacle 23, the flange 18 serving to deflect the same from the mouth of member 29. As the liquor fills the receptacle 23 it flows over the top edge of the sleeve 19, passing between the latter and member 29 into the space 31. As soon as the paper 21 becomes moist the chemical preparation carried by the latter colors the liquor with which it contacts, whereupon it is evident by a glance through the openings in the plate 20 that an attempt has been made to refill the bottle or adulterate its contents.

The advantages of my improved bottle will be readily apparent to those skilled in the art to which it appertains. It will be particularly observed that I have produced a structure by means of which it is practically impossible to introduce fraudulent or adulterated liquors into a bottle after the same has been once filled. It will also be observed that I have provided means whereby any attempt to refill the bottle will be readily detected.

I claim as my invention—

1. The combination with a bottle, of a cup-like receptacle located within but independent of said bottle and provided with a central overflow-outlet, said receptacle being adapted to catch any inflowing liquid, whereby refilling of the bottle is indicated.

2. The combination with a bottle, of a receptacle located therein and adapted to catch any inflowing liquid, and an indicating device located beneath said receptacle and operated by the overflow from the latter.

3. The combination with a bottle, of a cup-like receptacle located within but independent of said bottle and provided with a central overflow-outlet, said receptacle being adapted to catch any inflowing liquid, and a closure for said bottle having an outlet-conduit.

4. The combination with a bottle, of a receptacle located therein and adapted to catch any inflowing liquid, an indicating device located beneath said receptacle and operated by the overflow from the latter, and a closure for said bottle having an outlet-conduit.

5. The combination with a bottle, of a receptacle located therein and adapted to catch any inflowing liquid, said receptacle having an inclined bottom, and an indicating device located beneath said receptacle and operated by the overflow from the latter.

6. The combination with a bottle, of a tubular member located therein, a receptacle surrounding said tubular member, and an indicating device located beneath said receptacle and operated by the overflow from the latter.

7. The combination with a bottle, of a tubular member located therein, and a cup-like receptacle independent of said bottle and provided with an overflow-sleeve surrounding said tubular member, said receptacle being adapted to catch any inflowing liquid.

8. The combination with a bottle, of a tubular member located therein, a receptacle surrounding said tubular member, a chamber being formed below the former, and an indicating device located below said receptacle and located in said chamber.

9. The combination with a bottle, of a tubular member located therein, a receptacle provided with a sleeve surrounding said member, and an indicating device, said indicating device being located below said receptacle and operated by the overflow therefrom.

10. The combination with a bottle, of a tubular member located therein, a receptacle surrounding said tubular member and having an inclined bottom, a chamber being formed between said bottom and said tubular member, and an indicating device located in said chamber.

11. The combination with a bottle of a tubular member located therein, a cup-like receptacle independent of said bottle and provided with an overflow-sleeve, surrounding said member, and a closure for said bottle having an outlet-conduit.

12. The combination with a bottle, of a tubular member, a receptacle surrounding the same, a chamber being formed between said receptacle and said member and below the former, an indicating device located in said chamber, and a closure for said bottle having an outlet-conduit.

13. The combination with a bottle, of a tubular member located therein and provided with a valve-seat, a cup-like receptacle independent of said bottle and surrounding said member said receptacle being adapted to catch any inflowing liquid, a closure for said bottle provided with an outlet-conduit, and a valve carried by said closure and normally resting on said valve-seat.

14. The combination with a bottle, of a tubular member located therein and provided with a valve-seat, a receptacle surrounding said member, an indicating device located below said receptacle and operated by the overflow from the latter, a closure for said bottle having an outlet-conduit, and a valve carried by said closure adapted to normally rest on said valve-seat.

15. The combination with a bottle, of a tubular member located therein, a valve normally closing one end thereof, a cup-like receptacle independent of the bottle and surrounding said member, and a deflecting-flange carried by said member.

16. The combination with a bottle, of a tubular member located therein, a valve normally closing one end of said member, a receptacle surrounding said member, a deflecting-flange carried by said member, and an indicating device located below said receptacle operated by the overflow from the latter.

17. The combination with a bottle, of a tubular member located therein, a receptacle surrounding the same, a closure for said bottle having an outlet-conduit and having a perforated apron extended below the plane of the top edge of said tubular member, and a valve carried by said closure adapted to normally close the end of said tubular member.

18. The combination with a bottle, of a tubular member located therein, a receptacle surrounding the same, a closure for said bottle having an outlet-conduit and provided with a perforated apron, a valve carried by said closure and adapted to normally close the end of said tubular member, and a deflecting-flange carried by said tubular member.

19. The combination with a bottle, of a tubular member located therein, a cup-like receptacle independent of the bottle and surrounding said member, a closure for said bottle having an outlet-conduit, a spring-pressed valve-stem extending through said closure, and a valve carried by said stem and adapted to normally close said tubular member.

20. The combination with a bottle having an annular shoulder, a ring or collar resting on said shoulder, a tubular member having a flange adapted to rest on said ring or collar, a cup-like receptacle independent of the bottle and surrounding said member, and means for normally closing said tubular member.

21. The combination with a bottle having an annular shoulder, a ring or collar resting on said shoulder, a tubular member having a flange adapted to rest on said ring or collar, a receptacle surrounding said member, a chamber being formed between the bottom of said receptacle and said flange, and an indicating device located in said chamber.

22. The combination with a bottle, of a tubular member located therein, a receptacle surrounding the same, a chamber being formed between said receptacle and said member and below the former, and means for changing the color of any liquid which enters said chamber.

23. The combination with a bottle having an annular recess, of a tubular member located in said bottle, a receptacle surrounding the same, an indicating device located below said receptacle and operated by the overflow from the latter, and a closure for said bottle having spring-pressed lugs adapted to engage said recess and also provided with an outlet-conduit.

24. The combination with a bottle, of a tubular member located therein, a receptacle surrounding the same, an indicating device arranged to be operated by the overflow from said receptacle, a closure for said bottle having a depending perforated apron and also provided with an outlet-conduit, a spring-pressed valve adapted to normally close said tubular member, and a deflecting-flange carried by said tubular member.

25. The combination with a bottle, of a tubular member located therein, a receptacle surrounding the same and provided with an inclined bottom, whereby a chamber is formed between said receptacle and said tubular member, an indicating device located in said chamber, a deflecting-flange carried by said tubular member, a closure for said bottle provided with a perforated apron and having an outlet-conduit, and a spring-pressed valve carried by said closure and adapted to normally rest upon the upper end of said tubular member.

In testimony whereof I have signed this specification in the presence of two subscribing witnesses.

RAMON GABARRO JULIEN.

Witnesses:
M. M. PRICE,
CÁRLOS G. RENNEY.